United States Patent
Meyer et al.

(10) Patent No.: US 7,519,572 B2
(45) Date of Patent: Apr. 14, 2009

(54) SYSTEM AND METHOD FOR EFFICIENTLY OBTAINING A SUMMARY FROM AND LOCATING DATA IN A LOG FILE

(75) Inventors: Joel Peter Meyer, Durham, NC (US); William Augustus Parvin, Fuquay Varina, NC (US); Dean Merritt West, II, Cary, NC (US); Wenjian Qiao, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 10/906,331

(22) Filed: Feb. 15, 2005

(65) Prior Publication Data

US 2006/0184498 A1    Aug. 17, 2006

(51) Int. Cl.
G06F 17/30 (2006.01)
(52) U.S. Cl. .................... 707/1; 707/3; 707/100
(58) Field of Classification Search ............ 707/3, 707/200, 1, 100
See application file for complete search history.

(56) References Cited

U.S. PATENT DOCUMENTS

| 5,819,066 | A |  | 10/1998 | Bromberg et al. ............ 395/500 |
| 5,903,898 | A | * | 5/1999 | Cohen et al. ................. 707/204 |
| 5,961,598 | A |  | 10/1999 | Sime .......................... 709/224 |
| 6,004,276 | A | * | 12/1999 | Wright et al. ............... 600/508 |
| 6,144,967 | A |  | 11/2000 | Nock .......................... 707/103 |
| 6,185,615 | B1 | * | 2/2001 | Labiaga et al. .............. 709/224 |
| 6,247,149 | B1 | * | 6/2001 | Falls et al. .................... 714/45 |
| 6,470,388 | B1 | * | 10/2002 | Niemi et al. ................. 709/224 |
| 6,493,699 | B2 |  | 12/2002 | Colby et al. ................. 725/139 |
| 6,578,041 | B1 | * | 6/2003 | Lomet ......................... 707/102 |
| 6,591,228 | B1 | * | 7/2003 | Hall et al. .................... 702/187 |
| 6,768,994 | B1 | * | 7/2004 | Howard et al. ................ 707/10 |
| 6,789,115 | B1 | * | 9/2004 | Singer et al. ................. 709/224 |
| 7,062,516 | B2 | * | 6/2006 | Bhat .......................... 707/202 |
| 7,106,843 | B1 | * | 9/2006 | Gainsboro et al. .......... 379/191 |
| 7,251,660 | B2 | * | 7/2007 | Yang et al. .................. 707/100 |
| 7,379,978 | B2 | * | 5/2008 | Anderson et al. ........... 709/219 |
| 2002/0016771 | A1 | * | 2/2002 | Carothers et al. ............. 705/43 |
| 2002/0111887 | A1 |  | 8/2002 | McFarlane et al. ............ 705/30 |
| 2002/0138762 | A1 |  | 9/2002 | Horne ........................ 713/201 |
| 2002/0174136 | A1 |  | 11/2002 | Cameron et al. ............ 707/200 |
| 2003/0055809 | A1 | * | 3/2003 | Bhat ............................ 707/1 |
| 2003/0220940 | A1 |  | 11/2003 | Futoransky et al. ...... 707/104.1 |
| 2004/0128169 | A1 | * | 7/2004 | Lusen ........................... 705/3 |
| 2007/0201642 | A1 | * | 8/2007 | Cesarini ................ 379/114.03 |

* cited by examiner

*Primary Examiner*—Don Wong
*Assistant Examiner*—Thanh-Ha Dang
(74) *Attorney, Agent, or Firm*—Yee & Associates, P.C.; A. Bruce Clay

(57) ABSTRACT

Systems and methods for efficiently obtaining a summary from and locating data in a log file allow a user to efficiently obtain summary information and locate specific data records even in large log files. The system includes a configuration program, a log writing program, and a log reading program. The configuration program allows the user to control the duration of monitoring and the frequency of summary record creation by the log writing program. The log writing program writes data records, summary records, and summary information to a log file in response to monitored events. The log reading program retrieves summary records and data records from the log file using summary information in response to user requests.

1 Claim, 4 Drawing Sheets

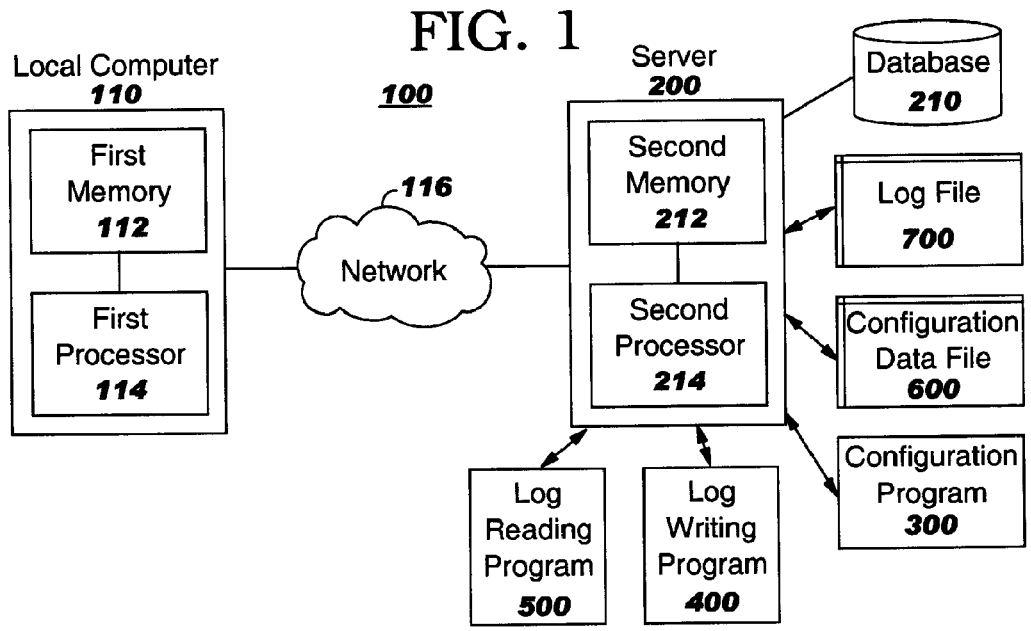
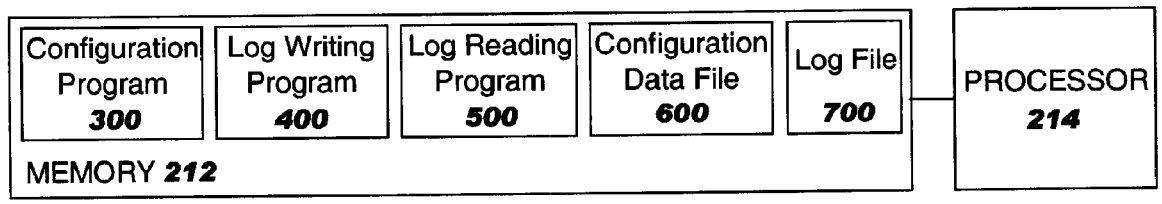
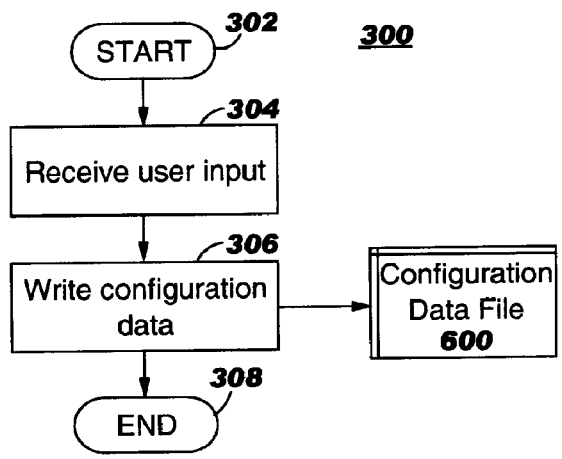

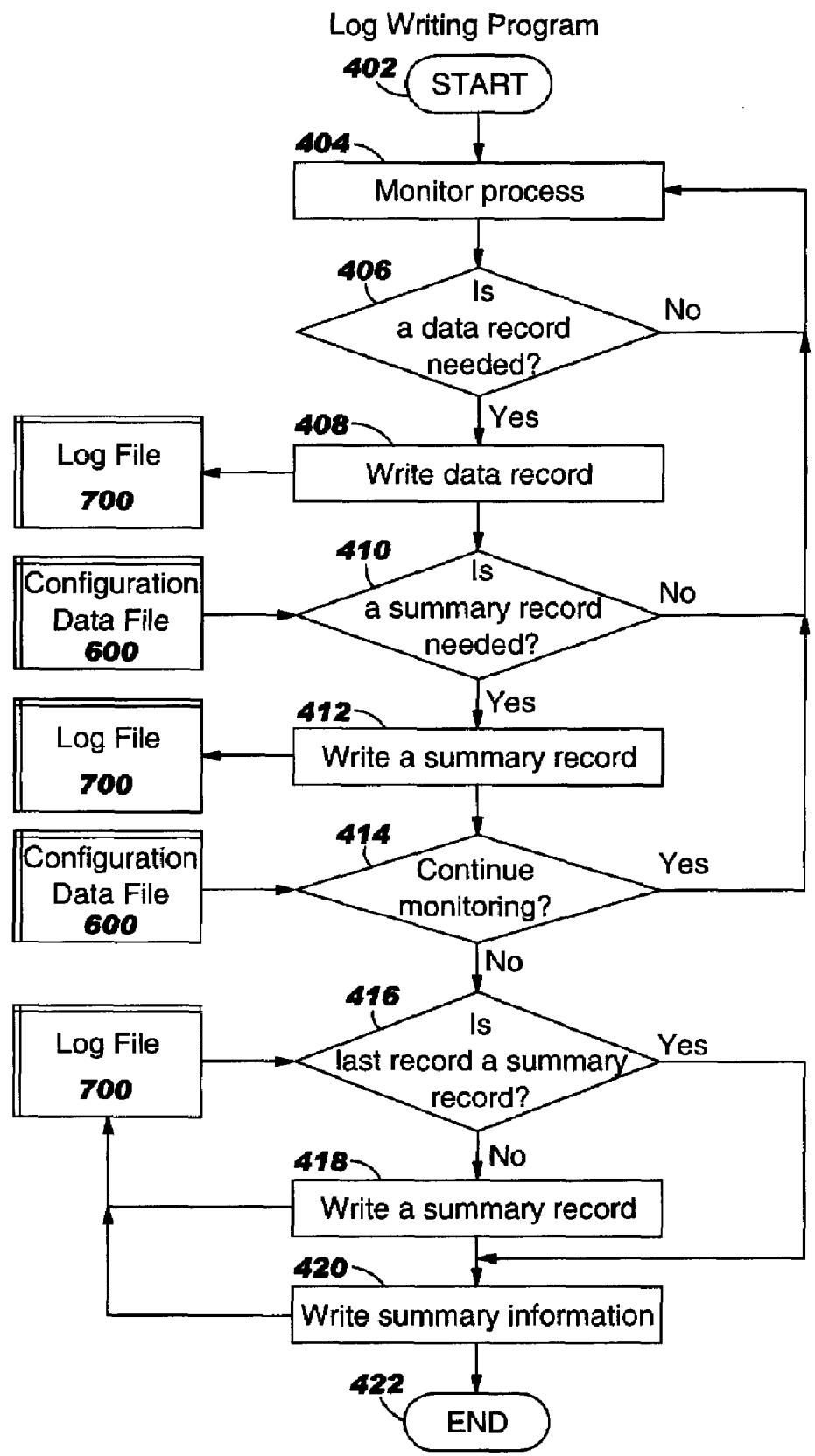

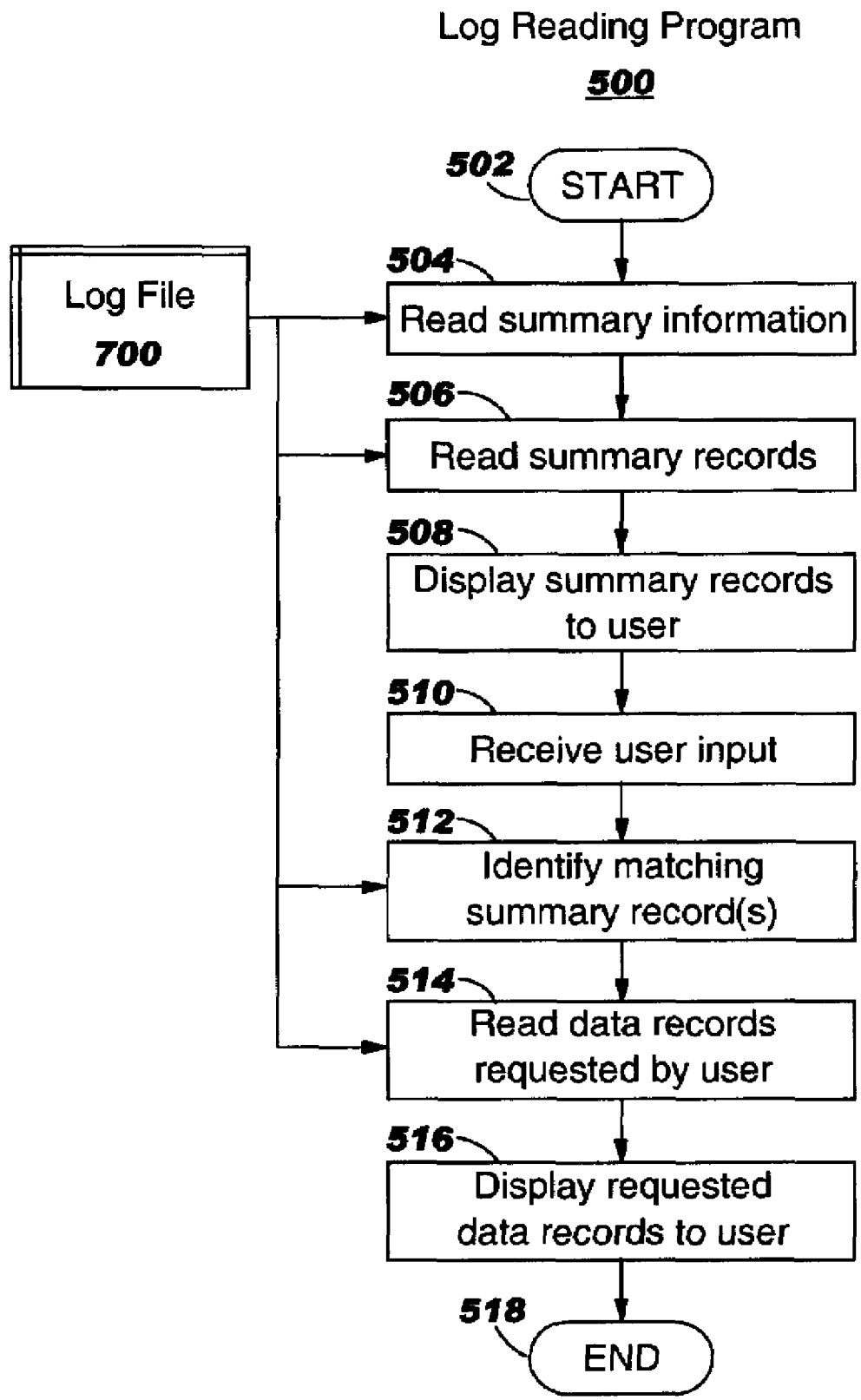

FIG. 6
Configuration Data File
600

| Number of data records per summary record 610 | Duration of Monitoring 620 |
|---|---|

FIG. 7
Log File
700

710 — Data record 1
Data record 2
...
Data record 100
720 — Summary record 1
712 — Event type
722 — Total number of events for each event type
724 — Total number of events
714 — Start time
716 — End time
726 — Start time of first data record
718 — Event Detail
728 — End time of last data record Data record 101
Data record 102
...
Data record 200
Summary record 2
...
Summary record n
800 — Summary information

FIG. 8
Summary Information
800

810 — Number of summary records
812 — Summary 1
...
Summary N
814 — offset in log file
816 — Start time
818 — End time
820 — Number of data records

SYSTEM AND METHOD FOR EFFICIENTLY OBTAINING A SUMMARY FROM AND LOCATING DATA IN A LOG FILE

FIELD OF THE INVENTION

This invention is related to the field of electrical computers and digital processing systems in general, and specifically to processes used to efficiently obtain a summary from a log file and to locate data in a log file.

BACKGROUND OF THE INVENTION

Currently, many computer systems track the performance of processes and log performance data so that it can be viewed and analyzed by users. The most common technique for retrieving data from a log file is to read the data from the beginning of the log file to its end sequentially. However, this approach has some drawbacks. First, the user cannot obtain a summary view of the entire log file without waiting for the entire file to be read and summarized. Second, it is difficult to view data in a selected time range when the time range is located far from the beginning of the file because all of the preceding records must be read before the desired records can be located.

While these drawbacks are not significant when the file size is small, they become considerable as the size of the log file grows. Many log files cover many activities over a substantial period of time, so large log files that require analysis are quite common.

The prior art discloses approaches for obtaining summary data and efficiently accessing records in log files and databases. For example, U.S. Pat. No. 5,819,066 discloses, inter alia, benchmarking a database server by generating analysis reports from log information stored in transition log files and process log files. U.S. Pat. No. 6,114,967 to to Nock (the '967 patent) discloses generation of a custom log analysis framework encapsulating the common attributes needed by log analysis tools. Similarly, U.S. Pat. No. 6,493,699 to Colby et al. (the '699 patent) discloses defining and characterizing an analysis space for analysis on a user defined subset of detail data to reduce analysis time. U.S. Patent Application Publication 2003/0055809 to Bhat (the '809 publication) discloses configuring log files with header information to allow a logging service to directly access various locations of the log file. Furthermore, U.S. Patent Application Publication 2003/0220940 to Futoransky et al. (the '940 publication) discloses secure auditing of information systems that analyze audit log data. U.S. Pat. No. 5,961,598 to Sime (the '598 patent) discloses a system and method for internet gateway performance charting that displays selected performance charts based upon gathered statistics. U.S. Patent Application Publication 2002/0111887 to McFarlane et al. (the '887 application) discloses an employee online activity monitoring system that monitors employee online activity. The '066 patent, '967 patent, the '699 patent, the '809 publication, '940 publication, the '598 patent, and the '887 application disclose methods for obtaining summary data, but these approaches do not include generation of summary data inside a log during the logging process.

In addition to the patents and publication discussed above, U.S. Patent Application Publication 2002/0174136 to Cameron et al. (the '136 publication) discloses high-performance transaction processing using a relational data base. However, the '136 publication neither maintains summary data within the log file, nor improves the efficiency of retrieving data records in a non-sequential way. U.S. Pat. No. 6,789,115 to Singer et al. (the '115 patent) discloses a system that captures, analyzes, stores, and reports system users' usage of multiple internet and/or intranet web servers. However, the system disclosed in the '115 patent does not aid in efficiently retrieving data records in a non-sequential way, and also does not reduce the number of input/output operations for retrieving summary data and individual data records. Furthermore, U.S. Patent Application Publication 2002/0138762 to Horne (the '762 publication) discloses management of log archival and reporting for data network security systems. However, the '762 publication does not generate summary data during the logging process, and does not integrate the archival and analysis processes.

What is needed beyond the prior art is a method to generate summary data from a a log file and to locate data in a log file during the logging process so that data records are retrieved efficiently in a non-sequential way, the number of input/output operations for retrieving the summary data is reduced, and the archival process is integrated with the analysis process.

SUMMARY OF THE INVENTION

The invention that meets the needs described above comprises of a log writing program to monitor a process and write data records, summary records, and summary information to a log file as needed, a log reading program to read the summary information, summary records, and user-specified data records and display them to a user, and a configuration program to permit a user to define the frequency of summary record creation and the duration of monitoring, which is recorded in a configuration data file. The log writing program monitors a process and writes data records to the log file to record activities. The log writing program writes a summary record whenever the criteria defined in the configuration data file is met. Once the monitoring terminates, the log writing program checks the last record in the log file to see if it is a summary record. If it is not, then the log writing program writes a summary record. Then, prior to terminating, the log writing program writes the summary information to the log file.

The log reading program begins by reading the summary information to locate the summary records and then reading the summary records and displaying them to the user. After the user requests a specific data record or range of data records, the log reading program identifies matching summary records and uses their location to access the requested data records quickly. The requested data records are then displayed to the user before the log reading program terminates.

The log writing program may be run automatically by a computer. The log reading program may be run in response to receiving a request from a user. The data records may include an event type, a start time, an end time, and an event detail. The summary records may include a total number of events for each event type covered by the summary record, a total number of events covered by the summary record, a start time of the first data record covered by the summary record, and an end time of the last data record covered by the summary record. The summary information may include a number of summary records, a summary record name, an offset in the log file, a start time, an end time, and a number of data records.

BRIEF DESCRIPTION OF DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts a computer network in which the invention may be employed;

FIG. 2 depicts a representative server computer in which the invention may reside;

FIG. 3 depicts a flow chart of the configuration program associated with the present invention;

FIG. 4 depicts a flow chart of the log writing program associated with the present invention;

FIG. 5 depicts a flow chart of the log reading program associated with the present invention;

FIG. 6 depicts a configuration data file associated with the present invention;

FIG. 7 depicts a log file associated with the present invention; and

FIG. 8 depicts summary information associated with the present invention.

DETAILED DESCRIPTION OF THE PREFERRED EMBODIMENT

A person of ordinary skill in the art will appreciate that the present invention may be implemented in a variety of software and hardware configurations. It is believed, however, that the invention is described best as a computer program that configures and enables one or more general-purpose computers to implement the novel aspects of the invention.

As used herein, "offset" means a position in a file relative to the current view, expressed as a count.

As used herein, "computer" means a machine having a processor, a memory, and an operating system, capable of interaction with a user or other computer, and shall include without limitation desktop computers, notebook computers, tablet computers, personal digital assistants (PDAs), servers, handheld computers, and similar devices.

As used herein, "memory" means a device where information can be stored and retrieved including without limitation internal and external storage devices, magnetic and optical disks, magnetic tape, compact disc, random access memory (RAM), read only memory (ROM), and available addressable storage space including Directly Attached Storage (DAS) and Network Attached Storage (NAS).

As used herein, "process" means a series of actions or operations conducing to an end, typically carried out by a computer program.

As used herein, "event" means something that happens during a process.

As used herein, "repository" means a portion of a memory, or of a distributed memory, in which a configuration data file and a log file can be stored for later retrieval.

FIG. 1 illustrates computer network 100 associated with the present invention for transferring data. Computer network 100 comprises local computer 110 electronically coupled to network 116. Local computer 110 is also coupled electronically to server 200 with database 210 via network 116. Network 116 may be a simple local area network (LAN) or may be a larger wide area network (WAN), such as the Internet. While computer network 200 depicted in FIG. 1 is intended to represent a possible network architecture, it is not intended to represent an architectural limitation.

Local computer 110 has first memory 112 and first processor 114 that receive input from and display results to a user. Server 200 has second memory 212 and second processor 214 that run configuration program 300, log writing program 400, and log reading program 500. Server 200 is linked to database 210 and stores configuration data file 600 and log file 700.

First memory 112 and second memory 212 may reside in server 200, database 110, or may be distributed in network 116 among one or more of server 200 and local computer 110. Alternatively, first memory 112 may be combined with second memory 212. First memory 112 is connected to network 116 by first processor 114. Second memory 212 is connected to network 116 by second processor 214.

The internal configuration of a computer, including connection and orientation of the processor, memory, and input/output devices, is well known in the art. The present invention is a methodology that can be embodied in a computer program. Referring to FIG. 2, server 200 stores configuration data file 600, log file 700, configuration program 300, log writing program 400, and log reading program 500 in second memory 212, where they are operable by second processor 214. Second memory 212 is only illustrative of memory within a computer and is not meant as a limitation.

FIG. 3 depicts a flow chart of configuration program 300. Configuration program 300 starts (302) and receives user input (304). Configuration program 300 then writes the received configuration data to configuration data file 600 (306) prior to terminating (308). Configuration data file 600 may be stored in a repository.

FIG. 4 depicts a flow chart of log writing program 400. Log writing program 400 starts (402) and monitors a process (404) waiting for an event that requires a data record 710 (406). Once an event occurs that needs a data record 710, log writing program 400 writes data record 710 to log file 700 (408). If the criteria for number of data records per summary record 610 contained within configuration data file 600 is satisfied, then log writing program 400 writes summary record 720 to log file 700 (412). If the criteria for duration of monitoring 620 contained within configuration data file 600 is not satisfied, log writing program 400 returns to step (404). Otherwise, log writing program 400 checks to see if the last record in log file 700 is a summary record 720 (416). If it is, log writing program 400 writes summary information 800 to log file 700 (420) and terminates (422). If it is not, log writing program 400 writes summary record 720 to log file 700 (418) before performing step (420) and terminating (422). Log file 700 may be stored in a repository.

FIG. 5 depicts a flow chart of log reading program 500. Log reading program 500 starts (502) and reads summary information 800 from log file 700 (504). Log reading program 500 uses data within summary information 800 to read summary records 720 (506). The data contained in summary records 720 is then displayed to a user (508). The display may be in chart form. After receiving input from the user (510), log reading program 500 identifies the matching summary record(s) 720 within summary information 800 (512) and uses their locations to efficiently retrieve data record(s) 710 requested by the user (514). The log reading program 500 displays the requested data record(s) 710 to the user (516) before terminating (518).

FIG. 6 shows configuration data file 600. Configuration data file 600 is populated by configuration program 300 with controlling data for log writing program 400 consisting of number of data records per summary record 610 and duration of monitoring 620. The number of data records per summary record 610 determines the frequency with which summary records 720 are created in log file 700 while monitoring step (404) occurs. Duration of monitoring 620 determines when log writing program 400 terminates and may be based on a length of time, a number of data records 720 written to log file 700, or an end time.

FIG. 7 shows log file 700. Log file 700 is populated by log writing program 400 with data records 710, summary records 720, and summary information 800. Data records 710 may include event type 712, start time 714, end time 716, and event detail 718. Summary records 720 may include the total number of events for each event type 722, the total number of events 724, start time of the first data record covered by the summary record 726, and end time of the last data record covered by the summary record 728.

FIG. 8 shows summary information 800. Summary information 800 is populated by log writing program 400. Summary information 800 may include number of summary records 810, summary record name 812, offset in the log file 814, start time 816, end time 818, and number of data records 820. When reading log file 700, log reading program 500 reads summary information 800 at the end of log file 700 and then reads all summary records 720 based on each summary record's 720 offset in the log file 814. Because log writing program 500 knows each summary record's 720 offset in the log file 814 and the range of time of the data records 710 it covers, log writing program 500 can rapidly locate data record(s) 710 when they are requested by the user.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A computer implemented method for displaying a data record within a log file, comprising:
    using a computer, configuring a first criteria for a number of data records per summary record and a second criteria for a duration of monitoring;
    monitoring a process;
    when an event occurs in the process requiring a data record, writing the data record to the log file;
    when the first criteria is satisfied, writing a summary record to the log file;
    when the second criteria is satisfied, checking to see if a last record in the log file is a summary record, and when the last record is the summary record, writing a summary information to an end of the log file, and when the last record is not the summary record, writing the summary record to the log file and then writing the summary information to the end of the log file;
    responsive to a request for the data record from a user, identifying a matching summary record within the summary information in the log file;
    locating the data record using the summary information at the end of the log file based on an offset of the summary record and based on a range of time of data records covered by the summary record; and
    displaying data from the data record to the user;
    wherein the data record comprises:
        an indication of an event type of the data record;
        an indication of a start time;
        an indication of an end time; and
        an event detail;
    wherein the summary record comprises:
        an indication of the number of events for each event type covered by the summary record;
        an indication of a total number of events covered by the summary record;
        an indication of a start time of a first data record covered by the summary record, and
        an indication of an end time of a last data record covered by the summary record; and
    wherein the summary information is written after a last summary record of the log file and comprises:
        an indication of the number of summary records within the log file; and
        for the summary record within the log file, the summary information comprises:
        an indication of a name of the summary record;
        an indication of the offset of the summary record in the log file;
        an indication of a start time of a first data record covered by the summary record;
        an indication of an end time of a last data record covered by the summary record; and
        an indication of a number of data records covered by the summary record.

* * * * *